US012122416B2

(12) United States Patent
Johanna et al.

(10) Patent No.: US 12,122,416 B2
(45) Date of Patent: Oct. 22, 2024

(54) SYSTEM AND METHOD FOR USING VIRTUAL FIGURES TO SUPPORT USERS OF AUTONOMOUS VEHICLES

(71) Applicant: GM Cruise Holdings LLC, San Francisco, CA (US)

(72) Inventors: Livia Johanna, San Francisco, CA (US); Hailun Zhou, San Francisco, CA (US); Theresa Foy, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 239 days.

(21) Appl. No.: 17/859,753

(22) Filed: Jul. 7, 2022

(65) Prior Publication Data

US 2024/0010224 A1  Jan. 11, 2024

(51) Int. Cl.
*B60W 60/00* (2020.01)
*B60W 50/10* (2012.01)
*B60W 50/14* (2020.01)

(52) U.S. Cl.
CPC .......... *B60W 60/001* (2020.02); *B60W 50/10* (2013.01); *B60W 50/14* (2013.01); *B60W 2050/146* (2013.01); *B60W 2540/045* (2020.02); *B60W 2540/229* (2020.02); *B60W 2540/30* (2013.01)

(58) Field of Classification Search
CPC .... B60W 60/001; B60W 50/10; B60W 50/14; B60W 2540/045; B60W 2540/229; B60W 2540/30; B60W 2050/146

USPC .......................................................... 701/23
See application file for complete search history.

(56) References Cited

U.S. PATENT DOCUMENTS

| | | | |
|---|---|---|---|
| 9,315,151 B2* | 4/2016 | Taylor | H04N 23/90 |
| 2014/0225927 A1* | 8/2014 | Choi | G09G 5/377 |
| | | | 345/1.2 |
| 2017/0041816 A1* | 2/2017 | Cho | H04W 64/006 |
| 2017/0115826 A1* | 4/2017 | Pryor | G06F 3/0308 |
| 2017/0212633 A1* | 7/2017 | You | G06F 3/0412 |
| 2021/0070307 A1* | 3/2021 | Welch | G02B 27/0172 |
| 2021/0272394 A1* | 9/2021 | Cella | G06Q 50/40 |
| 2022/0199079 A1* | 6/2022 | Hanson | H04L 51/02 |
| 2022/0207770 A1* | 6/2022 | Liu | G06T 7/579 |
| 2022/0363131 A1* | 11/2022 | Wagner | B60K 35/00 |

(Continued)

FOREIGN PATENT DOCUMENTS

| | | | | |
|---|---|---|---|---|
| CN | 114721470 A | * | 7/2022 | G06F 1/1626 |
| CN | 116348837 A | * | 6/2023 | G06F 3/011 |

*Primary Examiner* — Atul Trivedi

(57) ABSTRACT

Assistance can be provided to AV users through projection of graphical figures. A system may receive a request for assistance from a user of an AV. The system assigns the request to an agent who can assist the user. The system further provides a graphical representation (e.g., an avatar) of the agent to a device that can project the graphical representation to the user. The user can have a conversation with the graphical representation, e.g., based on information provided by the agent. The system can also provide an audio filter to the device for modifying an audio content presented by the device so that the modified audio content appears as if it is made by the graphical representation. The device may be a part of the AV or a client device of the user that can present VR, AR, or MR content. The device may be mobile.

20 Claims, 7 Drawing Sheets

(56) References Cited

U.S. PATENT DOCUMENTS

| | | | | |
|---|---|---|---|---|
| 2023/0104188 A1* | 4/2023 | Zilberman | G01P 21/00 | 701/33.1 |
| 2023/0135088 A1* | 5/2023 | Wang | B60W 40/09 | 701/23 |
| 2023/0136235 A1* | 5/2023 | Wang | G06V 20/58 | 701/23 |
| 2023/0136860 A1* | 5/2023 | Wang | G06V 20/58 | 345/419 |
| 2023/0139772 A1* | 5/2023 | Wang | G06V 10/454 | 345/419 |
| 2023/0347903 A1* | 11/2023 | Katz | G06V 20/597 | |
| 2023/0356588 A1* | 11/2023 | Oki | G09G 5/00 | |
| 2024/0042857 A1* | 2/2024 | Mimura | B60K 35/235 | |

* cited by examiner

SYSTEM AND METHOD FOR USING VIRTUAL FIGURES TO SUPPORT USERS OF AUTONOMOUS VEHICLES

TECHNICAL FIELD OF THE DISCLOSURE

The present disclosure relates generally to autonomous vehicles (AVs) and, more specifically, to using virtual figures to support users of AVs.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
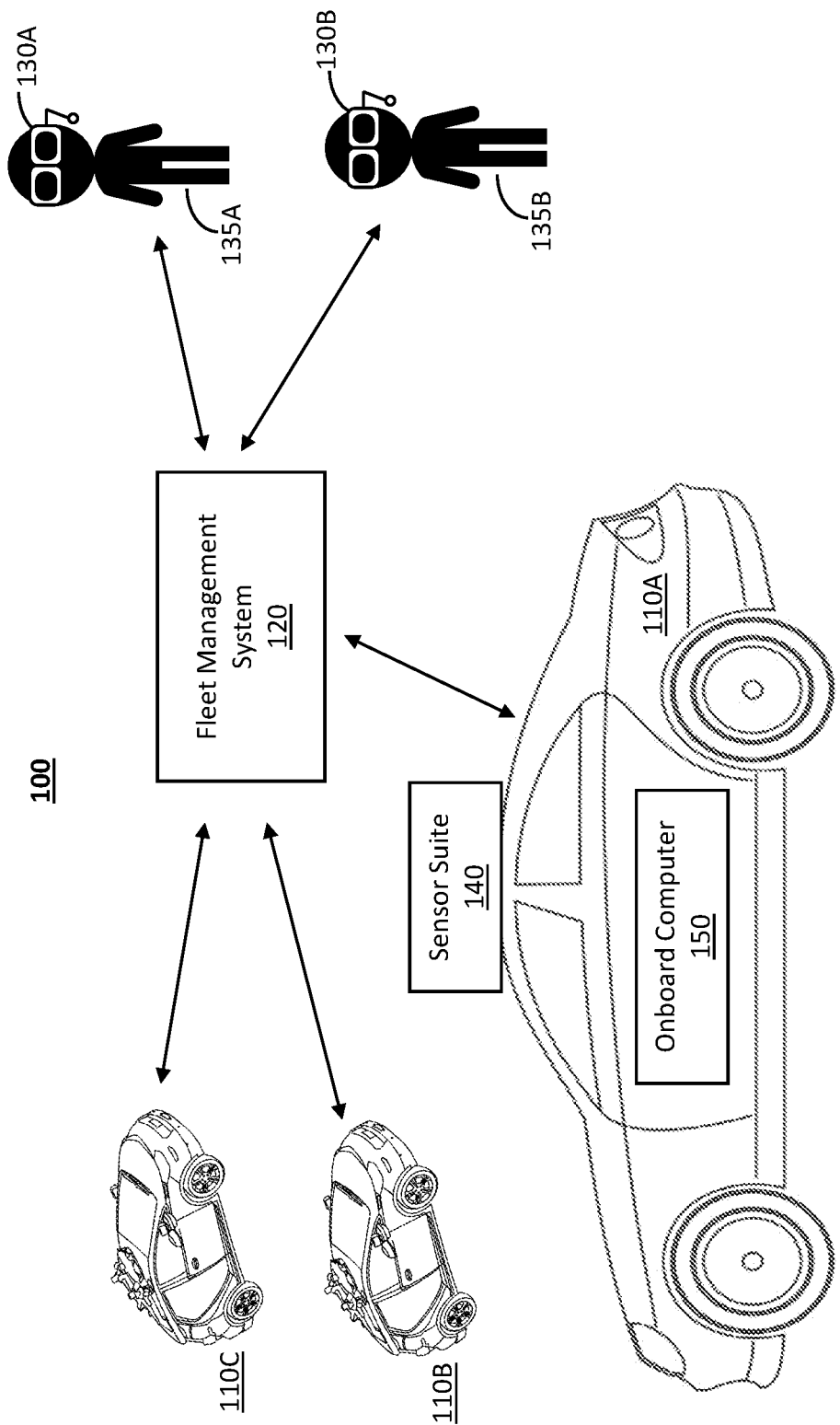
FIG. 1 illustrates a system including a fleet of AVs that can provide services to users.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless ride services. A person can request an AV to pick him/her up from a location and drop him/her off at another location. With the autonomous driving features of the AV, the person does not need to drive during the ride and can take the time to engage in other activities, such as communication, entertainment, training, work, and so on.

Embodiments of the present disclosure provides a user support platform for providing support to users of AVs through virtual figures. The user support platform may be facilitated by a system that manages a fleet of AVs that can provide services. A user of an AV (also referred to as "AV user") may be a person that receives a service provide by the AV. For example, the service is a ride service, and the user is a passenger of the AV. As another example, the service is a delivery service, and the user is a person who load one or more items into the AV or pick up one or more items from the AV. Users may run into issues during services provided by AVs. The issue may be lack of companion or a problem that interferes with the service. As AVs are driverless, users cannot get help from drivers, and assistance needs to be provided to users through a different channel. The user support platform can assist the user with the issue by presenting virtual figures to the user. A virtual figure is computer-generated graphics (e.g., a graphical icon), which can be two-dimensional (2D) or three-dimensional (3D), animated or static. Virtual figures may also be associated with audio content, e.g., audio simulating sounds made by the virtual figures. Virtual figures may be presented to users as part of a virtual reality (VR), AR, or mixed reality (MR) environment. Alternatively or additionally, virtual figures may be presented as a hologram.

A virtual figure may simulate a person, such as an agent who can assist a user. The user support platform may maintain a pool of virtual figures and enable the user to select one or more virtual figures from the pool. The user support platform may also enable the user to engage with a virtual figure to receive assistance. For instance, the user can talk with a virtual figure. The virtual figure can "talk back" to the user, e.g., through presentation of audio, text, actions (e.g., mouth movement, facial expression, etc.) associated with the virtual figure to the user. The virtual figure and audio can be presented to the user by a projection device controlled by the user support platform. The user support platform may manipulate the audio so that the audio appears to the user as if it is made by the virtual figure as opposed to the projection device. In some embodiments, the virtual figure is a graphical representation of an agent, and the audio associated with the virtual figure may be generated based on information from the agent. A virtual figure may alternatively be a graphical representation of an object other than a person. For instance, the virtual figure may simulate a part of the AV for showing the user how to deal with the part of the AV.

By using virtual figures to provide support to AV users, the user support platform can minimize or even eliminate the drawback of lacking drivers in AVs. Users can solve problems, receive supervision, get companionship, or be entertained with the presence of virtual figures during services provided by AVs. Therefore, users' experiences during the services can be improved.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System Facilitating User Support Platform

FIG. 1 illustrates a system 100 including a fleet of AVs that can provide services to users, according to some embodiments of the present disclosure. The system 100 includes AVs 110A-110C (collectively referred to as "AVs 110" or "AV 110"), a fleet management system 120, and client devices 130A and 130B (collectively referred to as "client devices 130" or "client device 130"). The AV 110A includes a sensor suite 140 and an onboard computer 150. Even though not shown in FIG. 1, the AV 110B or 110C can also include a sensor suite 140 and an onboard computer 150. In other embodiments, the system 100 may include more, fewer, or different components. For example, the fleet of AVs may include a different number of AVs 110 or client devices 130.

The fleet management system 120 manages the fleet of AVs 110. The fleet management system 120 may manage one or more services that provides or uses the AVs, e.g., a service for providing rides to users using the AVs. The fleet management system 120 selects one or more AVs (e.g., AV 110A) from a fleet of AVs 110 to perform a particular service or other task, and instructs the selected AV to drive to one or more particular location (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a public network, such as the Internet.

In some embodiments, the fleet management system 120 receives service requests for the AVs from client devices, such as a client device 130. The system environment may include various client devices, e.g., the client device 130A and client device 130B, associated with different users 135, e.g., users 135A and 135B. For example, the user 135A accesses an app executing on the client device 130A and requests a ride from a pickup location (e.g., the current location of the client device 130A) to a destination location. The client device 130A transmits the ride request to the fleet management system 120. The fleet management system 120 selects an AV 110 from the fleet of AVs 110 and dispatches the selected AV 110A to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 also facilitates a user support platform that provides support to passengers of the AVs 110. The user support platform enables AV passengers (e.g., users 135) to request assistance during their rides in AVs 110. In some embodiments, a user 135 may run into one or more issues during a ride in an AV 110. The issue may be a difficulty of the user 135 using a function of the AV 110 (such as entertainment function, navigation function, communication function, etc.), a problem with the AV 110 (such as a malfunction of the AV 110 or a component of the AV 110, etc.), an issue involving another person or vehicle (such as a car accident involving the AV 110 and another vehicle, the AV 110 being pulled over by police, etc.), an issue associated with the environment surrounding the AV 110, and so on. The user 135 may not be able to deal with the issue by him/herself. The user support platform can assist the user 135 to deal with situations like this. In other embodiments, the user 135 may not have any issues, but may prefer to have a companion. For instance, the user 135 may feel more comfortable being accompanied by a driver of the AV 110 or another passenger of the AV 110 during a ride in the AV 110. The user support platform enables the user 135 to make a support request get any support that the user 135 may need.

After receiving a support request, the user support platform may generate a graphical figure, which can be projected to the user 135 by using a projection device, such as the client device 130, the onboard computer 150, or another device. The graphical figure can be projected as VR, AR, or MR. In example, the graphical figure can be projected onto a seat in the AV 110 to simulate a driver or passenger of the AV 110. The graphical figure may be an animated graphical figure that can interact with the user 135. In some embodiments, the graphical figure is a graphical representation of an agent who receives the support request from the user support platform and can assist the user 135 with the support request. The graphical figure may act in accordance with information provided by the agent. For instance, the graphical figure may have a conversation with the user 135, and words spoken by the graphical figure may be provided by the agent.

The user support platform may also provide an audio filter to projection device. The projection device can modify audio content to be spoken by the graphical figure and present the audio content in a way that the audio content appears to be made by the graphical figure. The user support platform can also provide other content that can be projected to the user 135 to service the support request. In an example the user 135 has a question about a function of the AV 110 (e.g., a hardware component or a software function), the user support platform can generate virtual content illustrating the function and instruct the projection device to present the virtual content to the user. Compared with conventional customer support services, the user support platform can provide more effective support through projection of virtual content projected to users 135. Also, experiences of the user 135 during services provided by the AV 110 can be improved. More details regarding the user support platform are provided below in conjunction with FIGS. 2 and 3.

A client device 130 is a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. For example, the client device 130 includes a projector that can project virtual scene (e.g., three-dimensional (3D) virtual scene) to a user 135.

In various embodiments, the client device 130 can present VR, AR, or MR to the user 135. For purpose of illustration, a client device 130 in FIG. 1 is a headset. In other embodiments, a client device 130 may be a different type of device, such as a desktop or a laptop computer, a smartphone, a mobile telephone, a personal digital assistant (PDA), or another suitable device. The client device 130 may include components that facilitate interactions of the user 135 with virtual figures. For instance, the client device 130 may include one or more speakers and microphones that enable the user 135 to make a conversation with a virtual figure. The client device 130, or a part of the client device 130, may be attached to the AV 110 or be a component of the AV 110. For instance, a projector of the client device 130 may be a projector fixed in the AV 110. In some embodiments, a user 135 may have multiple client devices 130 for different purpose. For instance, a user 135 may use a client device 130 to interact with the fleet management system 120, e.g., to request ride services, and use another client device 130 to get access to virtual scenes.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may make requests with the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to delivery one or more items from a location to another location), and so on. The UI may allow users 135 to provide locations (e.g., pickup location, destination location, etc.) or other information that would be needed by AVs 110 to provide services requested by the users 135. The UI may also enable users 135 to make support requests, such as requests for assistance with issues associated with services provided by AVs 110.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 2.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive requests for information of the AV 110 from the fleet management system 120. For instance, the onboard computer 150 may receive a request for information (e.g., depth information) of an interior area of the AV 110, which the fleet management system 120 will use for facilitating projection of virtual content in the interior area. Certain aspects of the onboard computer 150 are described further in relation to FIG. 5.

Example Fleet Management System

Figure 2:
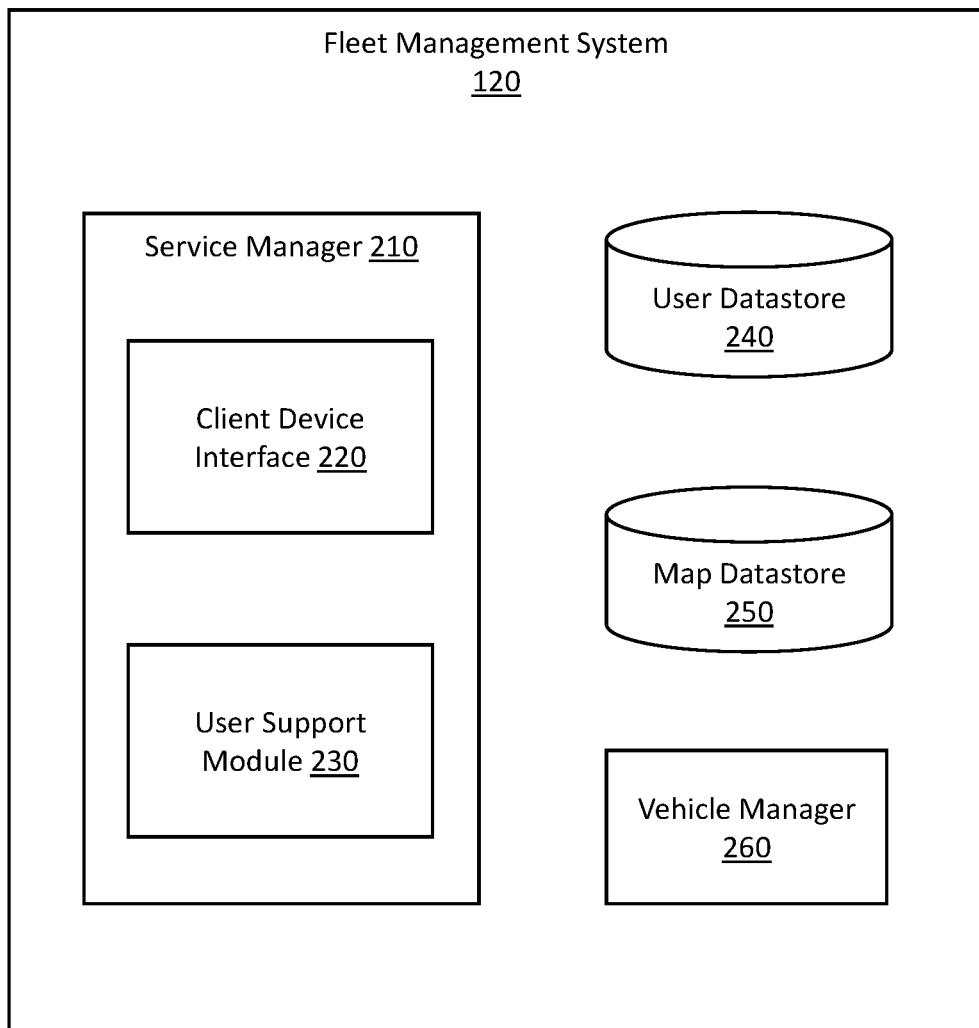
FIG. 2 is a block diagram showing a fleet management system, according to some embodiments of the present disclosure.

FIG. 2 is a block diagram showing the fleet management system, according to some embodiments of the present disclosure. The fleet management system 120 includes a service manager 210, a user datastore 240, a map datastore 250, and a vehicle manager 260. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The service manager 210 manages services that the fleet of AVs 110 can provide. The service manager 210 includes a client device interface 220 and a user support module 230. The client device interface 220 provides interfaces to client devices, such as headsets, smartphones, tablets, computers, and so on. For example, the client device interface 220 may provide one or more apps or browser-based interfaces that can be accessed by users, such as the users 135, using client devices, such as the client devices 130. The client device interface 220 enables the users to submit requests to a ride service provided or enabled by the fleet management system 120. In particular, the client device interface 220 enables a user to submit a ride request that includes an origin (or pickup) location and a destination (or drop-off) location. The ride request may include additional information, such as a number of passengers traveling with the user, and whether or not the user is interested in shared ride with one or more other passengers not known to the user.

The client device interface 220 can also enable users to select ride settings. The client device interface 220 can provide one or more options for the user to engage with a virtual figure, e.g., having conversation with a virtual figure, sharing a ride with a virtual figure, having a virtual driver, and so on. The client device interface 220 may enable a user to opt-in or opt-out an engagement with a virtual figure. The client device interface 220 may further enable the user to opt-in or opt-out to certain monitoring features, e.g., to opt-in or opt-out to have the interior sensors 440 obtain sensor data of the user. The client device interface 220 may explain how this data is used by the service manager 210 (e.g., for providing support to the user, etc.) and may enable users to selectively opt-in to certain monitoring features, or to opt-out of all of the monitoring features. In some embodiments, the user support platform may provide a modified version of a virtual activity if a user has opted out of some or all of the monitoring features.

The user support module 230 facilitates a user support platform, e.g., the user support platform described above. The user support module 230 manages support requests received from users of AVs. In some embodiments, the user support module 230 maintains a queue of pending support requests, in which the pending support requests may be arranged in an order. A pending support request is a support request that have not been completed. A support request may be considered completed after the support requested by the user has been provided or the issue that triggered the support request has been resolved. The user support module 230 may process pending support requests based on the order in the queue.

The user support module 230 processes a support request through a virtual figure. The virtual figure may include computer-generated graphics (e.g., 2D or 3D graphics) that can be presented to the user. In some embodiments, the virtual figure is presented as VR content. In other embodiments, the virtual figure is presented as AR content, e.g., as a virtual object that does not exist in the real-world by appears as if it resides in the real-world, e.g., resides inside the AV 110 or in a real-world environment surrounding the AV 110. The virtual object may simulate a person (e.g., a driver, a passenger, a support agent who can assist the user, etc.), a plant, an animal, a cartoon, or other types of objects. The user support module 230 instructs a projection device to project the virtual figure to the user.

The projection device can also facilitate engagement of the user with the virtual figure, e.g., a conversation between the user and the virtual figure. For instance, the user support module 230 may generate an audio content and instruct the projection device to present the audio content to simulate sound made by the virtual figure. The user support module 230 may generate the audio content based on input of the user, e.g., words spoken by the user. In some embodiments (e.g., embodiments where the virtual figure representing an agent), the user support module 230 may generate the audio content based on information provided by the agent, such as questions to users, answers to questions from users, etc. to the user support module 230. In some embodiments (e.g., embodiments where the graphical representation is projected to a location that is different from a location of the projection device), the user support module 230 can also instruct the projection device to use an audio filter to modify the audio content so that the user can perceive the audio content as if the audio content is from the graphical representation as opposed to the projection device. Certain aspects of the user support module 230 are described below in conjunction with FIG. 3.

In embodiments where the user support module 230 instructs an agent to service a support request, the user support module 230 may be in communication with a device associated with the agent. The device may be a desktop or a laptop computer, a smartphone, a mobile telephone, a PDA, or another suitable device. The user support module 230 may send information related to the support request to the agent's device. The information may include the support request itself and guidance on how to provide the requested support. The agent may provide assistance through the device. For instance, the agent may submit messages (text messages, audio messages, video messages, etc.) to be presented to the user through a UI executed on the device. The UI can send the messages to the user support module 230, and the user support module 230 may use the messages to present a virtual representation of the agent to the user. The UI may also enable the agent to update a status of the support request. For instance, the agent can change the status to "completed" through the UI after he or she determines that the issue that triggers the support request has been successfully handled. Certain aspects of the user support module 230 are described below in conjunction with FIG. 3.

The user datastore 240 stores ride information associated with users of the ride service, e.g., the users 135. The user datastore 240 may store an origin location and a destination location for a user's current ride. The user datastore 240 may also store historical ride data for a user, including origin and destination locations, dates, and times of previous rides taken by a user. The historical data of the user may also include information associated with historical support requests made by the user during the previous rides, such as virtual figures projected to the user for the historical support requests, the user's interactions with the virtual figures, the user's ratings on the virtual figures, information of AVs 110 associated with the historical support requests, and so on. In some cases, the user datastore 240 may further store future ride data, e.g., origin and destination locations, dates, and times of planned rides that a user has scheduled with the ride service provided by the AVs 110 and fleet management system 120. Some or all of the data of a user in the user datastore 240 may be received through the client device interface 220, an onboard computer (e.g., the onboard computer 150), a sensor suite of AVs 110 (e.g., the sensor suite 140), a third-party system associated with the user and the fleet management system 120, or other systems or devices.

In some embodiments, the user datastore 240 also stores data indicating user interests associated with services provided by AVs. The fleet management system 120 may include one or more learning modules (not shown in FIG. 2) to learn user interests based on user data. In some embodiments, a learning module may use information in the user datastore 240 to predict the user's interest one or more virtual figure. For instance, the learning module may retrieve information associated with virtual figures that have been presented to the user, such as images of the virtual figures, audio content associated with the virtual figures, the user's interactions with the virtual figures, the user's ratings on the virtual figures, and so on. The learning module may use the information to determine whether the user would be interested in having a virtual figure for a current or future service provided by an AV. The learning module may use the information to generate or identify one or more virtual figures that the user would be interested in. For instance, modality for communication between a virtual figure and a user may be determined based on the accessibility of the user (e.g., deaf, blind, etc.), age of the user, other demographic information, language, identity of friends/family, interests, paid virtual figures, and so on.

In other embodiments, a learning module may compare locations in the user datastore 240 with map datastore 250 to identify places the user has visited or plans to visit. For example, the learning module may compare an origin or destination address for a user in the user datastore 240 to an entry in the map datastore 250 that describes a building at that address. The map datastore 250 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 240.

The map datastore 250 stores a detailed map of environments through which the AVs 110 may travel. The map datastore 250 includes data describing roadways, such as e.g., locations of roadways, connections between roadways, roadway names, speed limits, traffic flow regulations, toll information, etc. The map datastore 250 may further include data describing buildings (e.g., locations of buildings, building geometry, building types), and data describing other objects (e.g., location, geometry, object type) that may be in the environments of AV 110. The map datastore 250 may also include data describing other features, such as bike lanes, sidewalks, crosswalks, traffic lights, parking lots, signs, billboards, etc.

Some of the map datastore 250 may be gathered by the fleet of AVs 110. For example, images obtained by the exterior sensors 410 of the AVs 110 may be used to learn information about the AVs' environments. As one example, AVs may capture images in a residential neighborhood during a Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 120 and/or AVs 110 may have one or more image processing modules to identify features in the captured images or other sensor data. This feature data may be stored in the map datastore 250. In some embodiments, certain feature data (e.g., seasonal data, such as Christmas decorations, or other features that are expected to be temporary) may expire after a certain period of time. In some embodiments, data captured by a second AV 110 may indicate that a previously-observed feature is no longer present (e.g., a blow-up Santa has been removed) and in response, the fleet management system 120 may remove this feature from the map datastore 250.

The vehicle manager 260 manages and communicates with the fleet of AVs 110. The vehicle manager 260 assigns the AVs 110 to various tasks and directs the movements of the AVs 110 in the fleet. The vehicle manager 260 includes a vehicle manager 260 and an AV 110 interface 290. In some embodiments, the vehicle manager 260 includes additional functionalities not specifically shown in FIG. 2. For example, the vehicle manager 260 instructs AVs 110 to drive to other locations while not servicing a user, e.g., to improve geographic distribution of the fleet, to anticipate demand at particular locations, etc. The vehicle manager 260 may also instruct AVs 110 to return to an AV 110 facility for fueling, inspection, maintenance, or storage.

In some embodiments, the vehicle manager 260 selects AVs from the fleet to perform various tasks and instructs the AVs to perform the tasks. For example, the vehicle manager 260 receives a ride request from the client device interface 220. The vehicle manager 260 selects an AV 110 to service the ride request based on the information provided in the ride request, e.g., the origin and destination locations. If multiple AVs 110 in the AV 110 fleet are suitable for servicing the ride request, the vehicle manager 260 may match users for shared rides based on an expected compatibility. For example, the vehicle manager 260 may match users with similar user interests, e.g., as indicated by the user datastore 240. In some embodiments, the vehicle manager 260 may match users based on shared interest in virtual figures.

The vehicle manager 260 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 260 may select AVs for service in a manner that optimizes one or more additional factors, including fleet distribution, fleet utilization, and energy consumption. The vehicle manager 260 may interface with one or more predictive algorithms that project future service requests and/or vehicle use, and select vehicles for services based on the projections.

The vehicle manager 260 transmits instructions dispatching the selected AVs. In particular, the vehicle manager 260 instructs a selected AV 110 to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 260 may dispatch the same AV 110 to pick up additional users at their pickup locations, e.g., the AV 110 may simultaneously provide rides to three, four, or more users. The vehicle manager 260 further instructs the AV 110 to drive autonomously to the respective destination locations of the users.

Figure 3:
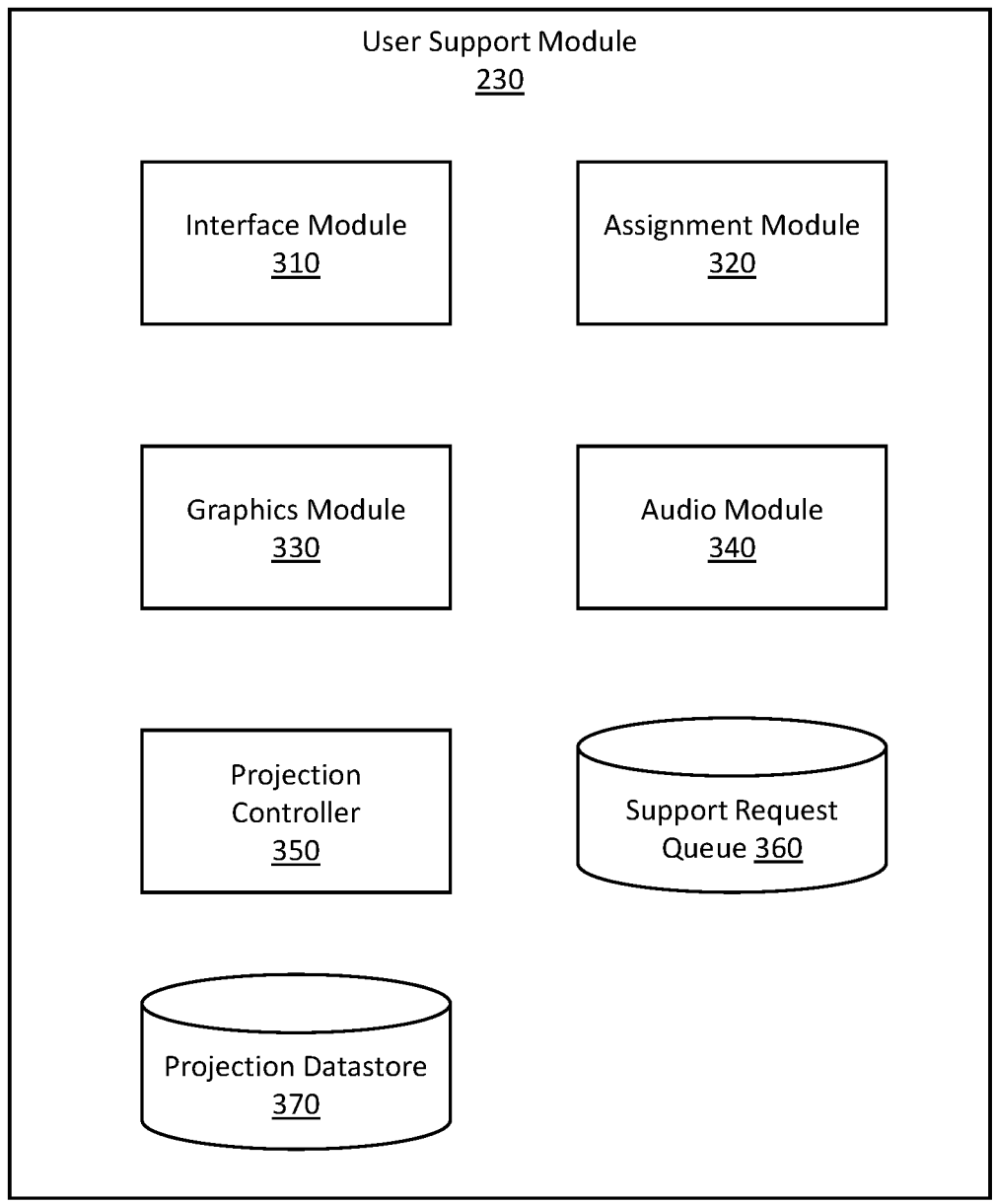
FIG. 3 is a block diagram showing a user support module, according to some embodiments of the present disclosure.

FIG. 3 is a block diagram showing the user support module 230, according to some embodiments of the present disclosure. As described above, the user support module 230 processes support requests made by users of AVs 110 through virtual figures. The user support module 230 includes an interface module 310, an assignment module 320, a graphics module 330, an audio module 340, a projection controller 350, a support request queue 360, and a projection datastore 370. In alternative configurations, different and/or additional components may be included in the user support module 230. Further, functionality attributed to one component of the user support module 230 may be accomplished by a different component included in the user support module 230, a different component included in the fleet management system 120, or a different system than those illustrated.

The interface module 310 facilitates communications of the user support module 230 with other components of the fleet management system 120 or other systems or devices. In some embodiments, the interface module 310 receives support requests made by users of AV 110, e.g., from the client device interface 220, onboard computers of AVs, or other devices that the users may use to interact with the user support module 230. The interface module 310 may also communicate with AVs, e.g., onboard computers of AVs. The interface module 310 may send requests for sensor data to AVs and receive requested sensor data from the AVs. The interface module 310 may provide received data to other components of the user support module 230. For example, the interface module 310 may provide received support request to the graphics module 330 or the audio module 340.

In some embodiments, the interface module 310 also facilitates a communication between a user seeking support and an agent who can provide the support. For instance, the interface module 310 may receive information of the agent from the support manager and connect the agent to the user based on the information. The information of the agent may be information identifying the agent (e.g., ID number, name, etc.), information for contacting the agent (e.g., phone number, computer ID, etc.), and so on. In an example where the interface module 310 receives a call (e.g., audio call, video call, etc.) from the user, the interface module 310 can transfer the call to a device associated with the agent so that the agent can assist the passenger through the call.

The assignment module 320 assigns support requests to agents. In some embodiments, the assignment module 320 forms a support request queue 360 that includes all pending support requests received by the interface module 310. The support requests in the support request queue 360 may be arranged in an order. The assignment module 320 may determine the order by ranking the pending support requests, e.g., based on urgency scores of the support requests. An urgency score indicates a level of urgency for servicing the support request. The assignment module 320 may determine an urgency score for a support request based on the issue that trigger that support request. For instance, compared with a support request trigger by a malfunctioning entertainment function of the AV, a support request trigger by a malfunctioning driving function of the AV may have a higher urgency score and can be placed before the support request related to the entertainment function in the support request queue 360.

The assignment module 320 may process the support requests in the support request queue 360 based on the order. For instance, the assignment module 320 would process the support request related to the driving function of the AV before it processes the support request related to the entertainment function of the AV. In some embodiments, to process a support report, the assignment module 320 may start with identifying agents that are available to assist the passenger who made the support report. The assignment module 320 may identify available agents based on agent information. The agent information may include identifying information of agents (e.g., name, employee ID, etc.), information of devices associated with agents (e.g., device ID, available functions, etc.), and so on. The assignment module 320 may determine that an agent is available based on a status of the agent, which indicates that the agent is not servicing any other support requests. The status of the agent may be provided by the agent, e.g., through a device associated with the agent, to the assignment module 320, e.g., through the interface module 310. The status of the agent may be updated by agent or be updated automatically. For instance, the status of the agent can be automatically changed to unavailable after the assignment module 320 assigns a support request to the agent.

In embodiments where the assignment module 320 identifies multiple available agents for a support request, the assignment module 320 may select one of the agents to service the support request, e.g., based on historical communications of the agents with the passenger making the support request, familiarity of the agents with the AV serving the user, the types of support sought by the user, and so on. After the assignment module 320 finds an agent to service a support request, the assignment module 320 may send information of the support request to the agent's device. The assignment module 320 may also enable a communication of the agent with the passenger, e.g., by routing a call from the passenger to the agent's device. In embodiments where the assignment module 320 fails to identify any available agent at the time, the assignment module 320 may determine a waiting time based on the urgency of the support report and estimated time for an agent to complete another support request. The assignment module 320 may notify the passenger how long he or she needs to wait to get assistance.

The graphics module 330 generates virtual figures to be presented to users for servicing support requests from the users. The virtual figures may be stored in the projection datastore 370. A virtual figure is a computer-generated graphical icon, such as an avatar, etc. In some embodiments, the graphics module 330 maintains a pool of virtual figures and enables users to select virtual figures from the pool. The pool of virtual figures may include 2D virtual figures, 3D virtual figures, animated virtual figures, static virtual figures, other types of virtual figures, or some combination thereof. The graphics module 330 may generate some or all of the virtual figures in the pool. Additionally or alternatively, the graphics module 330 may receive some or all of the virtual figures in the pool from a third-party system.

In some embodiments, the graphics module 330 may select, from the pool, candidate virtual figures for a user based on the user's interest. The graphics module 330 may determine the user's interest based on information that explicitly or implicitly indicates the user's interest. Information that explicitly indicates the user's interest may include the user's explicit expression of preferred virtual figures, which may be provided by the user through the interface module 310 or the client device interface 220. Information that implicitly indicates the user's interest may include historical virtual figures that the user selected for historical AV services, the user's feedback on the historical virtual figures, the user's interaction with the historical virtual figures, descriptive information (e.g., biographic, demographic, or other types of descriptive information) of the user, interests of other users related to the user, and so on. The graphics module 330 may provide the candidate virtual figures to the user, e.g., through a UI of a projection device, and allow the user to select from the candidate virtual figures.

In other embodiments, the graphics module 330 may allow the user to specify one or more attributes of virtual figures and select candidate virtual figures for the user based on the attributes. Example attributes include category of objects represented by virtual figures (e.g., person, animal, plant, etc.), 2D or 3D, animated or static, color, shape, size, and so on. In yet other embodiments, the graphics module 330 may allow the user to create a virtual figure. For instance, the graphics module 330 provides a pool of components of virtual figures and allows the user to select components and create a virtual figure using the selected components. In an example where the virtual figure is an avatar of a person, the components may include body parts (e.g., hair, skin, eyes, etc.), clothes, shoes, accessories (e.g., hat, purses, etc.), and so on.

The graphics module 330 may generate a virtual figure for a user of an AV 110 based on information of a real-world environment associated with the AV 110. The real-world environment may be an area inside the AV 110 or surrounding the AV 110. In some embodiments, the graphics module 330 generates a virtual figure based on a real-world area where the virtual figure will be projected to augment the real-world area. To create a sense of immersion of the user, it is important to blend the virtual figure and the real-world area together. In an example where the virtual figure is a graphical representation of a driver of the AV 110, the virtual figure needs to have a pose that fits the driver's seat of the AV 110, the steering wheel, or other objects in the AV 110. The graphics module 330 may generate a model of the area, e.g., based on depth information or images of the area. The depth information or images of the area may be captured by the sensor suite 140 of the AV 110, such as the interior sensors 440. The model may be a 3D model, such as a 3D mesh model. The model may include models of real-world objects in the area.

The graphics module 330 generates the virtual figure based on the model of the area so that when the virtual figure is projected to the area, the virtual figure appears as if it was real. The graphics module 330 may identify one or more objects in the area onto which a portion or the whole virtual figure would be projected and generates the virtual figure based on the models of the identified objects. In the example where the virtual figure is a graphical representation of a driver of the AV 110, the graphics module 330 can generate a model of the driver's compartment of the AV 110 and generate the virtual figure based on the driver's seat, the steering wheel, etc.

The audio module 340 generates audio content to be presented to users for servicing support requests from the users. The audio content may be stored in the projection datastore 370. The audio content may be presented by a projection device that projects a virtual figure so that it appears that the virtual figure talks. In some embodiments (e.g., embodiments where virtual figures represent agents who provide support to AV users), the audio module 340 generates audio content based in information provided by the agents. The information provided by the agents may include messages for making conversations with AV users, such as text messages, audio messages, video messages, and so on. The audio module 340 may receive the messages from devices associated with the agents through the interface module 310. In embodiments where an agent provides an audio message, the audio module 340 may instruct the projection device to present the audio message as is. Alternatively, the audio module 340 may modify the audio message, e.g., by changing a tone or voice of the agent, and instruct the projection device to present the modified audio message.

In some embodiments, the audio module 340 may generate audio content based on sensor data (e.g., captured sound) of the user. For instance, the audio module 340 receives sensor data indicating a question asked by the user, the audio module 340 may determine an answer to the question and generate audio content that provides the answer. The audio module 340 may also determine a time stamp indicating a time when the audio content is to be presented. The audio module 340 may determine the time stamp based on a time when the agent provides the information for the audio content, sensor data (e.g., captured sound) of the user, animation of the virtual figures, other factors, or some combination thereof.

In some embodiments (such as embodiments where virtual figures are projected to augment a real-world environment), the audio module 340 may generate audio filters and modify (or instruct the projection device to modify) audio content with the audio filters. The audio module 340 may determine an orientation (e.g., position, direction, or both) of a virtual figure in a real-world environment where the virtual figure is projected and an orientation of the projection device. In response to determining that the orientation of the virtual figure is different from the orientation of the projection device, the audio module 340 generates an audio filter that simulates audio distortion at a position of the user in the real-world environment. The audio module 340 further modifies (or instructs the projection device to modify) the audio content so that the modified audio content, when presented to the user, appears to the user as if it is made by the virtual figure, as opposed to the projection device.

In some embodiments, the audio module 340 generates the audio filter based on the real-world environment, one or more locations of the real-world environment where the virtual figure will be presented, and one or more positions (e.g., predicted positions or positions detected by the sensor suite 140) of the user in the real-world environment when the virtual figure is presented to the user. The audio module 340 may generate a model of the real-world environment based on depth information or images of the real-world environment. The model may be a 3D representation of the real-world environment, such as a 3D mesh model of the real-world environment. The audio module 340 may also determine room modes of the real-world environment based on the model. The room modes may be determined based on dimensions of the model and/or attenuation parameters of objects in the real-world environment. A room mode is represented by amplification of signal strength as a function of frequency and position. The room modes may include axial modes, tangential modes, or oblique modes. The audio module 340 can determine one or more room mode parameters (e.g., Q factor, etc.) based on a function of the amplification and frequency at the position of the user. The room mode parameters define an audio filter that as applied to audio content, simulates acoustic distortion at the position of the user.

The projection controller 350 controls projection of virtual figures generated by the graphics module 330 and audio content generated by the audio module 340. In some embodiments, the projection controller 350 controls projection devices that presents virtual figures or audio content to users of AVs 110. The projection controller 350 may send a virtual figure and audio content associated with the virtual figure to a projection device associated with a user or an AV 110. The projection device may be a client device (e.g., client device 130), the onboard computer 150, or another device. The projection controller 350 may also provide the projection device instructions regarding one or more times to present the virtual figure and audio content.

In embodiments where the projection device is mobile, the projection controller 350 may control motions of the projection device. For instance, the projection controller 350 may instruct the projection device to move to a particular position. The projection controller 350 may identify the position based on information from the user (e.g., captured sound of the user that indicates the position), information from an agent, and so on. In embodiments where the projection device includes one or more sensors, the projection controller 350 may control operation of the sensors. For instance, the projection controller 350 may instruct the sensors to capture sensor data in an environment surrounding the projection device. The projection controller 350 may provide the sensor data to the graphics module 330 or audio module 340 for generating or modifying virtual figures or audio content. In an example, the projection controller 350 may instruct the projection device to detect a damage to a part of the AV 110, and the graphics module 330 or audio module 340 may generate graphical or audio content based on the damage. The graphical or audio content may provide a solution to deal with the damage. The projection controller 350 can instruct the projection device to present the graphical or audio content to the user.

Example Sensor Suite

Figure 4:
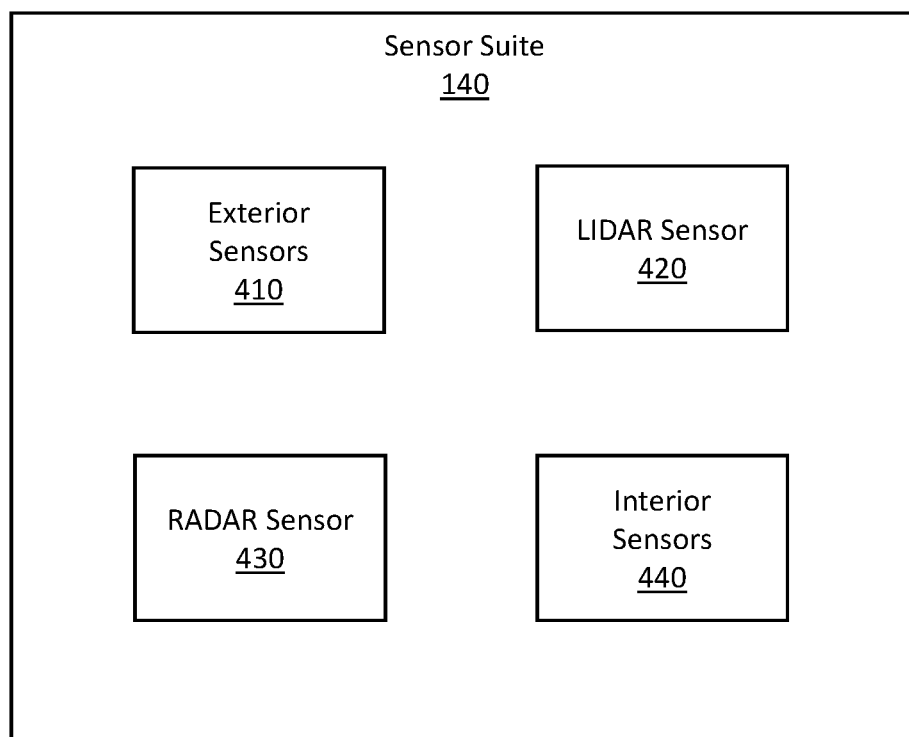
FIG. 4 is a block diagram showing a sensor suite, according to some embodiments of the present disclosure.

FIG. 4 is a block diagram showing the sensor suite 140, according to some embodiments of the present disclosure. The sensor suite 140 includes exterior sensors 410, a LIDAR sensor 420, a RADAR sensor 430, and interior sensors 440. The sensor suite 140 may include any number of the types of sensors shown in FIG. 4, e.g., one or more exterior sensors 410, one or more LIDAR sensors 420, etc. The sensor suite 140 may have more types of sensors than those shown in FIG. 4, such as the sensors described with respect to FIG. 1. In other embodiments, the sensor suite 140 may not include one or more of the sensors shown in FIG. 4.

The exterior sensors 410 detect objects in an environment around the AV 110. The environment may include a scene in which the AV 110 operates. Example objects include persons, buildings, traffic lights, traffic signs, vehicles, street signs, trees, plants, animals, or other types of objects that may be present in the environment around the AV 110. In some embodiments, the exterior sensors 410 include exterior cameras having different views, e.g., a front-facing camera, a back-facing camera, and side-facing cameras. One or more exterior sensors 410 may be implemented using a high-resolution imager with a fixed mounting and field of view. One or more exterior sensors 410 may have adjustable field of views and/or adjustable zooms. In some embodiments, the exterior sensors 410 may operate continually during operation of the AV 110. In an example embodiment, the exterior sensors 410 capture sensor data (e.g., images, etc.) of a scene in which the AV 110 drives. In other embodiment, the exterior sensors 410 may operate in accordance with an instruction from the onboard computer 150 or an external system, such as the user support module 230 of the fleet management system 120. Some of all of the exterior sensors 410 may capture sensor data of one or more objects in an environment surrounding the AV 110 based on the instruction.

The LIDAR sensor 420 measures distances to objects in the vicinity of the AV 110 using reflected laser light. The LIDAR sensor 420 may be a scanning LIDAR that provides a point cloud of the region scanned. The LIDAR sensor 420 may have a fixed field of view or a dynamically configurable field of view. The LIDAR sensor 420 may produce a point cloud that describes, among other things, distances to various objects in the environment of the AV 110.

The RADAR sensor 430 can measure ranges and speeds of objects in the vicinity of the AV 110 using reflected radio waves. The RADAR sensor 430 may be implemented using a scanning RADAR with a fixed field of view or a dynamically configurable field of view. The RADAR sensor 430 may include one or more articulating RADAR sensors, long-range RADAR sensors, short-range RADAR sensors, or some combination thereof.

The interior sensors 440 detect the interior of the AV 110, such as objects inside the AV 110. Example objects inside the AV 110 include passengers, client devices of passengers, components of the AV 110, items delivered by the AV 110, items facilitating services provided by the AV 110, and so on. The interior sensors 440 may include multiple interior cameras to capture different views, e.g., to capture views of an interior feature, or portions of an interior feature. The interior sensors 440 may be implemented with a fixed mounting and fixed field of view, or the interior sensors 440 may have adjustable field of views and/or adjustable zooms, e.g., to focus on one or more interior features of the AV 110. The interior sensors 440 may transmit sensor data to a perception module (such as the perception module 530 described below in conjunction with FIG. 5), which can use the sensor data to classify a feature and/or to determine a status of a feature.

In some embodiments, some or all of the interior sensors 440 may operate continually during operation of the AV 110. In other embodiment, some or all of the interior sensors 440 may operate in accordance with an instruction from the onboard computer 150 or an external system, such as the user support module 230 of the fleet management system 120. The interior sensors 440 may include a camera that can capture images of passengers. The interior sensors 440 may also include one or more microphones that can capture sound in the AV 110, such as a conversation made by a passenger.

Example Onboard Computer

Figure 5:
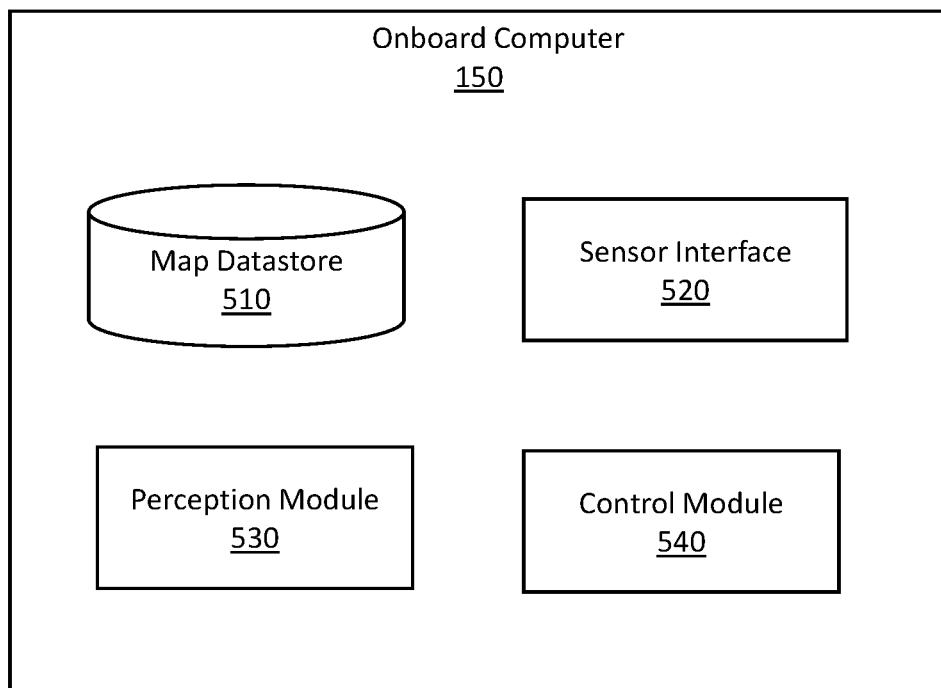
FIG. 5 is a block diagram showing an onboard computer, according to some embodiments of the present disclosure.

FIG. 5 is a block diagram showing the onboard computer 150 of the AV 110 according to some embodiments of the present disclosure. The onboard computer 150 includes map data 510, a sensor interface 520, a perception module 530, and a control module 540. In alternative configurations, fewer, different and/or additional components may be included in the onboard computer 150. For example, components and modules for conducting route planning, controlling movements of the AV 110, and other vehicle functions are not shown in FIG. 5. Further, functionality attributed to one component of the onboard computer 150 may be accomplished by a different component included in the onboard computer 150 or a different system, such as the fleet management system 120.

The map data 510 stores a detailed map that includes a current environment of the AV 110. The map data 510 may include any of the map datastore 250 described in relation to FIG. 5. In some embodiments, the map data 510 stores a subset of the map datastore 250, e.g., map data for a city or region in which the AV 110 is located.

The sensor interface 520 interfaces with the sensors in the sensor suite 140. The sensor interface 520 may request data from the sensor suite 140, e.g., by requesting that a sensor capture data in a particular direction or at a particular time. For example, in response to a request for sensor data from the user support module 230, the sensor interface 520 instructs the sensor suite 140 to capture sensor data of a user in the AV 110. The sensor data may be captured sound, orientation of the user, and so on.

The sensor interface 520 is configured to receive data captured by sensors of the sensor suite 140, including data from exterior sensors mounted to the outside of the AV 110, and data from interior sensors mounted in the passenger compartment of the AV 110. The sensor interface 520 may have subcomponents for interfacing with individual sensors or groups of sensors of the sensor suite 140, such as a camera interface, a LIDAR interface, a RADAR interface, a microphone interface, etc. In embodiments where the sensor interface 520 receives a request for sensor data from the user support module 230, the sensor interface 520 may provide sensor data received from the sensor suite 140 to the user support module 230.

The perception module 530 identifies objects and/or other features captured by the sensors of the AV 110. For example, the perception module 530 identifies objects in the environment of the AV 110 and captured by one or more exterior sensors (e.g., the sensors 210-230). The perception module 530 may include one or more classifiers trained using machine learning to identify particular objects. For example, a multi-class classifier may be used to classify each object in the environment of the AV 110 as one of a set of potential objects, e.g., a vehicle, a pedestrian, or a cyclist. As another example, a pedestrian classifier recognizes pedestrians in the environment of the AV 110, a vehicle classifier recognizes vehicles in the environment of the AV 110, etc. The perception module 530 may identify travel speeds of identified objects based on data from the RADAR sensor 430, e.g., speeds at which other vehicles, pedestrians, or birds are traveling. As another example, the perception module 53—may identify distances to identified objects based on data (e.g., a captured point cloud) from the LIDAR sensor 420, e.g., a distance to a particular vehicle, building, or other feature identified by the perception module 530. The perception module 530 may also identify other features or characteristics of objects in the environment of the AV 110 based on image data or other sensor data, e.g., colors (e.g., the colors of Christmas lights), sizes (e.g., heights of people or buildings in the environment), makes and models of vehicles, pictures and/or words on billboards, etc.

The perception module 530 may further process data from captured by interior sensors (e.g., the interior sensors 440 of FIG. 2) to determine information about and/or behaviors of passengers in the AV 110. For example, the perception module 530 may perform facial recognition based on sensor data from the interior sensors 440 to determine which user is seated in which position in the AV 110. As another example, the perception module 530 may process the sensor data to determine passengers' states, such as gestures, activities (e.g., whether passengers are engaged in conversation), moods (whether passengers are bored (e.g., having a blank stare, or looking at their phones)), and so on. The perception module may analyze data from the interior sensors 440, e.g., to determine whether passengers are talking, what passengers are talking about, the mood of the conversation (e.g., cheerful, annoyed, etc.). In some embodiments, the perception module 530 may determine individualized moods, attitudes, or behaviors for the users, e.g., if one user is dominating the conversation while another user is relatively quiet or bored; if one user is cheerful while the other user is getting annoyed; etc. In some embodiments, the perception module 530 may perform voice recognition, e.g., to determine a response to a game prompt spoken by a user.

In some embodiments, the perception module 530 fuses data from one or more interior sensors 440 with data from exterior sensors (e.g., exterior sensors 410) and/or map data 510 to identify environmental objects that one or more users are looking at. The perception module 530 determines, based on an image of a user, a direction in which the user is looking, e.g., a vector extending from the user and out of the AV 110 in a particular direction. The perception module 530 compares this vector to data describing features in the environment of the AV 110, including the features' relative location to the AV 110 (e.g., based on real-time data from exterior sensors and/or the AV's real-time location) to identify a feature in the environment that the user is looking at.

While a single perception module 530 is shown in FIG. 5, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 540 controls operations of the AV 110, e.g., based on information from the sensor interface 520 or the perception module 530. In some embodiments, the control module 540 controls operation of the AV 110 by using a trained model, such as a trained neural network. The control module 540 may provide input data to the control model, and the control model outputs operation parameters for the AV 110. The input data may include sensor data from the sensor interface 520 (which may indicate a current state of the AV 110), objects identified by the perception module 530, or both. The operation parameters are parameters indicating operation to be performed by the AV 110. The operation of the AV 110 may include perception, prediction, planning, localization, motion, navigation, other types of operation, or some combination thereof. The control module 540 may provide instructions to various components of the AV 110 based on the output of the control model, and these components of the AV 110 will operation in accordance with the instructions. In an example where the output of the control model indicates that a change of traveling speed of the AV 110 is required given a prediction of traffic condition, the control module 540 may instruct the motor of the AV 110 to change the traveling speed of the AV 110. In another example where the output of the control model indicates a need to detect characteristics of an object in the environment around the AV 110 (e.g., detect a speed limit), the control module 540 may instruct the sensor suite 140 to capture an image of the speed limit sign with sufficient resolution to read the speed limit and instruct the perception module 530 to identify the speed limit in the image.

Example AR Environment for Assisting AV User

Figure 6:
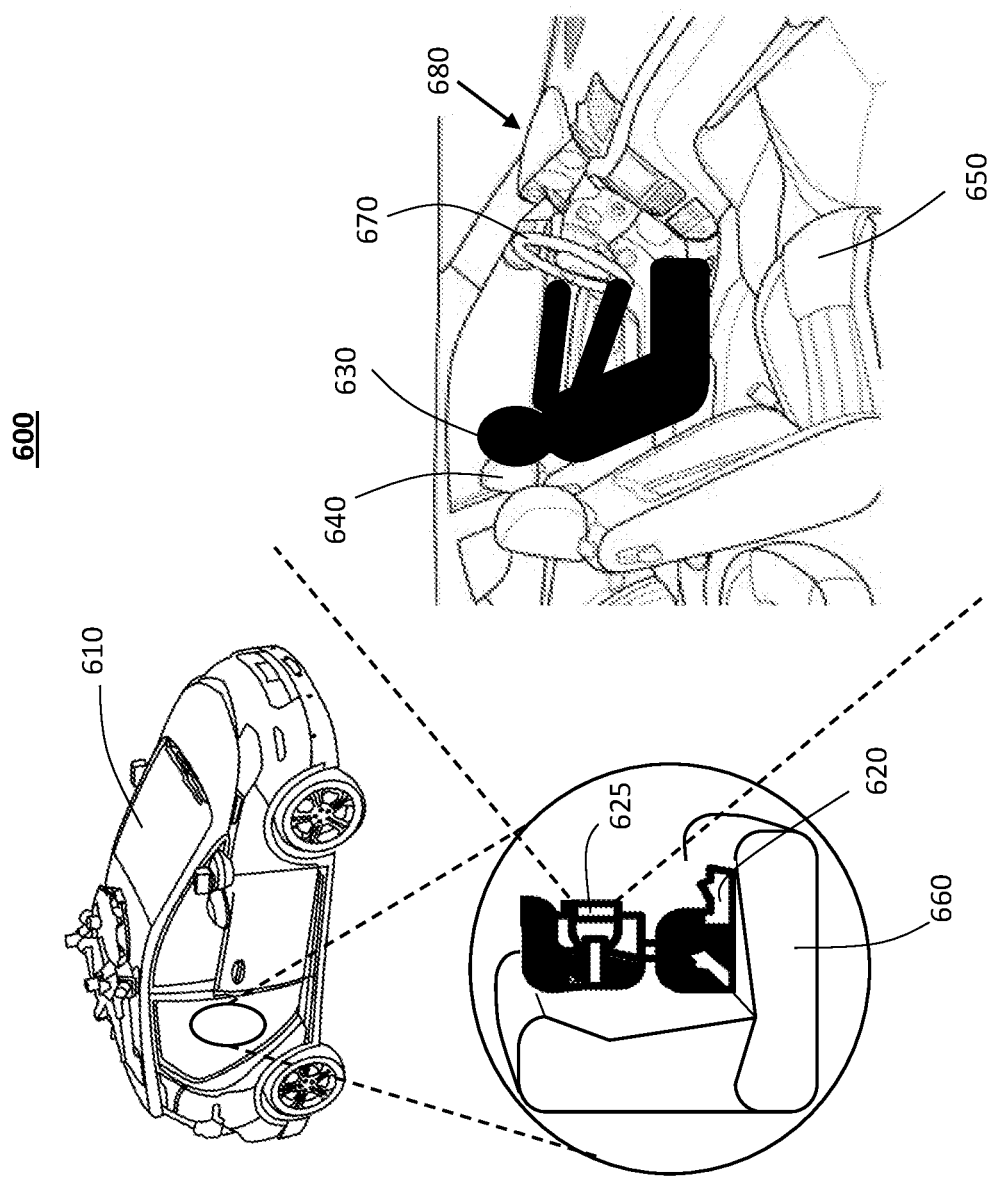
FIG. 6 illustrates example augmented reality (AR) environment in which a user of an AV receives support through a virtual figure, according to some embodiments of the present disclosure.

FIG. 6 illustrates example AR environment 600 in which a user 620 of an AV 610 receives support through a virtual figure 630, according to some embodiments of the present disclosure. The AV 610 may be an embodiment of the AV 110A shown in FIG. 1. In the embodiments of FIG. 6, the user 620 is a passenger that receives a ride service provided by the AV 610 and is having a ride in the AV 610. In other embodiments, the user 620 may receive a different service provided by the AV 610 and may not be a passenger.

The AR environment 600 may be a view of the user 620. The AR environment 600 is a mixture of virtual world and real-world. The virtual world includes the virtual figure 630, which is projected to the user by the projection device 625. The projection device 625 can present images (e.g., the virtual figure 630) and audio (e.g., audio simulating sound made by the virtual figure 630) to the user 620. In some embodiments, the projection device 625 may receive the virtual figure 630 and audio from the user support module 230. The projection device 625 may receive the virtual figure 630 and audio in response to a support request made by the user 620 either through the projection device 625 or another device. The support request is a request for assistance. For instance, the user 620 may want to have a companion or need help with a problem that occurred during the ride. The virtual figure 630 may simulate an agent who can provide the assistance to the user 620. The audio may simulate a talk or conversation of the agent with the user 620.

The real-world in the AR environment 600 includes a part of the interior of the AV 610, such as seats 640, 650, and 660, steering wheel 670, and a center console 680. The real-world may include other objects that is not labeled or shown in FIG. 6. The virtual figure 630 is projected into the real-world, particularly on the seat 640 and steering wheel 670, to simulate a driver of the AV 610. The virtual figure 630 may be generated based on the seat 640 and steering wheel 670 so that it can appear to the user 620 as if it is a real driver. The virtual figure 630 may be animated and can make poses or gestures that a real driver would make during driving.

Even though the virtual figure 630 is not a real driver and does not control the motion of the AV 610, it can provide support to the user 620. For instance, the user 620 may feel more comfortable with riding in a car with a driver versus a driverless car. Also, the user 620 may engage with the virtual figure 630 to solve a problem. For instance, the user 620 may talk to the virtual figure 630. The virtual figure 630 may make poses or gestures based on what the user 620 has said. The virtual figure 630 can also "talk back" to the user 620, as the projection device 625 can present audio that simulate sound made by the virtual figure 630. The audio may appear as if it is from the virtual figure 630 as opposed to the projection device 625. For instance, the audio may have been modified, e.g., by using an audio filter generated by the user support module 230, based on a model of a part of or the whole interior of the AV 610 and a position of the user 620 in the AV 610.

In addition to the virtual figure 630 and the audio, the projection device 625 can present other content to the user 620. In an example where the problem that triggers the user 620 to make support request is associated with a part of the AV 610, the projection device 625 may present a graphical representation of the part of the AV 610 to the user 620 to help the user resolve the problem. For example, the user 620 indicates that he or she does not know how to use a function of the center console 680, the projection device 625 may present a video to the user to show the user how to use the function. As another example, the user 620 indicates that a door cannot be closed properly, the projection device 625 may present an image or video of the door to show the user how to fix the problem. The projection device 625 is a headset in FIG. 6. In other embodiments, the projection device 625 can be other types of devices, e.g., a smart phone, a computing device, etc. For instance, the projection device 625 is not worn by the user 620. Rather, it may be mobile and can navigate inside or outside the AV 610. The projection device 625 may include one or more sensors that can detect the surrounding real-world environment. The sensor data captured by the projection device 625 may be used, e.g., by the user support module 230 or the agent, to assist the user 620, e.g., to diagnosis a cause of the problem triggered the support request or to confirm that that problem is successfully resolved.

Even though FIG. 6 shows an AR environment 600, the user 620 may receive support through a VR or MR environment. For instance, the seats 640 and 650, steering wheel 670, and center console 680 may be virtual objects, e.g., computer-generated graphics, as opposed to real-world objects. The virtual objects can be presented by the projection device 625, in addition to the virtual figure 630. With the presence of the virtual figure 630, the experience of the user 620 during the ride can be improved, and the AV 610 can provide better ride service.

Example Method of Using Virtual Figure to Provide Support to AV User

Figure 7:
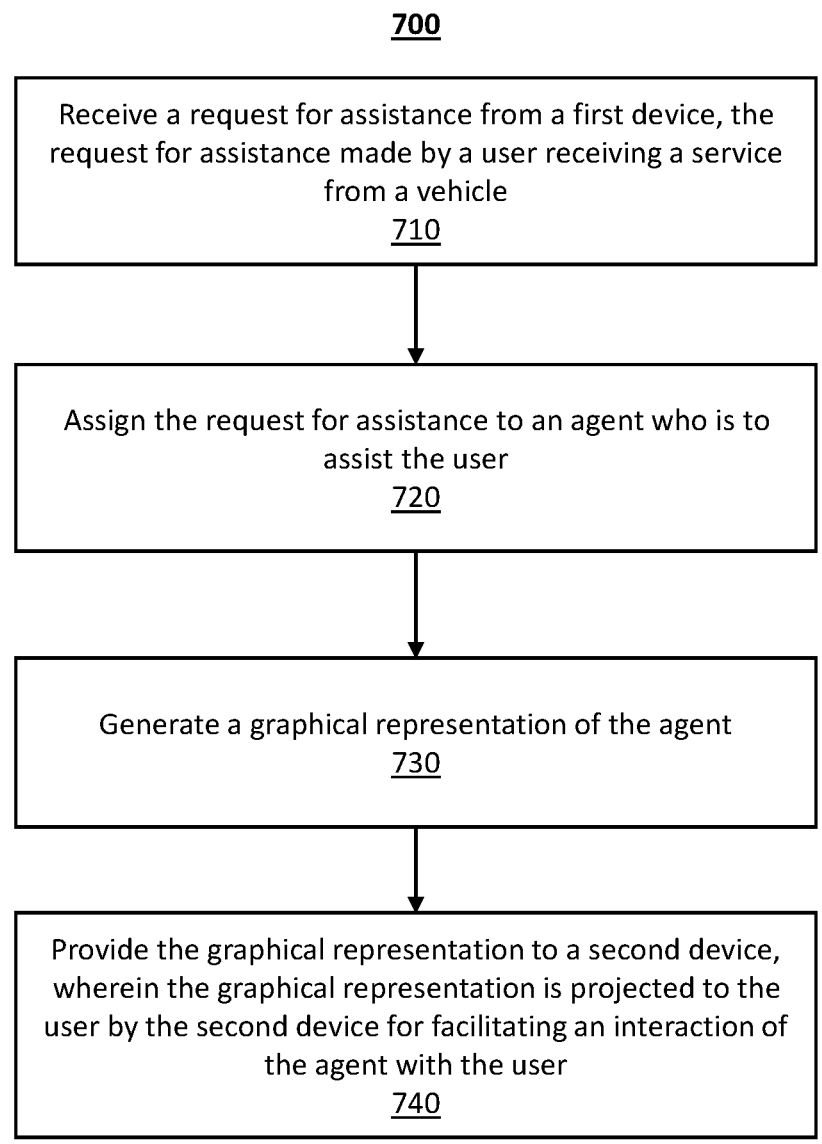
FIG. 7 is a flowchart showing another method of using a virtual figure to provide support to a user of an AV, according to some embodiments of the present disclosure.

FIG. 7 is a flowchart showing a method 700 of using a virtual figure to provide support to a user of an AV, according to some embodiments of the present disclosure. The method 700 may be performed by the user support module 230. Although the method 700 is described with reference to the flowchart illustrated in FIG. 7, many other methods of providing support to a user of an AV may alternatively be used. For example, the order of execution of the steps in FIG. 7 may be changed. As another example, some of the steps may be changed, eliminated, or combined.

The user support module 230 receives, in 710, a request for assistance from a first device. The request for assistance is made by a user receiving a service from a vehicle. In some embodiments, the service may be a ride service, and the user may be a passenger of the vehicle. In other embodiments, the service may be a different type of service, such as a delivery service, and the user may be a person that loads one or more items into the vehicle or a person that picks up one or more items from the vehicle. In some embodiments, the request for assistance may be made by another person, such as another passenger in the vehicle or a person (e.g., a policeman, etc.) that does not receive the service from the vehicle. The request for assistance may alternatively be made by the vehicle itself, such as an onboard computer (e.g., the onboard computer 150) of the vehicle.

The user support module 230 assigns, in 720, the request for assistance to an agent who is to assist the user. The user support module 230 generates, in 730, a graphical representation of the agent. The graphical representation may be an animated graphical representation. The graphical representation may be configured to have a conversation with the user based on information provided by the agent. In some embodiments, part of the graphical representation can move based on the conversation. For instance, a mouth icon in the graphical representation moves as the graphical representation "talks" to the user. In some embodiments, the user support module 230 obtains a model of a seat of the vehicle. The model includes information of a structure of the seat and may be a 3D representation of the seat. The user support module 230 generates the graphical representation based on the model of the seat. The second device is configured to project the graphical representation onto the seat. The seat may be a driver seat of the vehicle.

In some embodiments, the user support module 230 obtains a model of an interior area of the vehicle. The model may be a 3D representation of the interior area. The user support module 230 may generate the 3D representation of the interior area based on depth information describing the interior area. The user support module 230 also determines a location of the graphical representation in the interior area. The user support module 230 can generate an audio filter based on the model of the interior area and the location and provide the audio filter to the second device. The user support module 230 may also determine a position of the user in the vehicle and generate the audio filter further based on the user's position. The acoustic filter is to be used by the second device to present audio content to the user. The audio content, as modified by the acoustic filter, is to appear as if it is made by the graphical representation.

The user support module 230 provides, in 740, the graphical representation to a second device. The graphical representation is projected to the user by the second device for facilitating an interaction of the agent with the user. The second device may be one of the projection devices described above. In some embodiments, the second device is mobile and can move inside or outside the vehicle. The second device may include one or more sensors that can detect the environment surrounding it as it moves. The sensor data captured by the second device can be used to assist the user. For instance, the second device may move, e.g., based on an instruction of the agent, to a part of the vehicle to detect a condition of the part.

The user support module 230 may identify a part of the vehicle based on the interaction of the agent with the user. The user support module 230 may generate a graphical representation of the part of the vehicle and provide the graphical representation of the part of the vehicle to the second device. The graphical representation of the part of the vehicle is projected to the user by the second device. In an example, the user support module 230 identifies a door of the vehicle based on a conversation of the user with the agent in which the user says that the door cannot be properly closed. The user support module 230 may generate an animation to show the user how to close the door. The animation includes a virtual door that represents the door. The animation can be presented to the user by the second device.

In some embodiments, the user support module 230 provides a plurality of candidate graphical representations of the agent to the first device or the second device. The plurality of candidate graphical representations includes the graphical representation. The user support module 230 receives a selection of the graphical representation from the plurality of candidate graphical representations. The selection being made by the user through a UI provided by the first device or the second device. The first device and the second device may be a same device associated with the user.

Select Examples

Example 1 provides a method, including receiving a request for assistance from a first device, the request for assistance made by a user receiving a service from a vehicle; assigning the request for assistance to an agent who is to assist the user; generating a graphical representation of the agent; and providing the graphical representation to a second device, where the graphical representation is projected to the user by the second device for facilitating an interaction of the agent with the user.

Example 2 provides the method of example 1, where the graphical representation is an animated graphical representation and is configured to have a conversation with the user based on information provided by the agent.

Example 3 provides the method of example 2, further including obtaining a model of an interior area of the vehicle; determining a location of the graphical representation in the interior area; generating an audio filter based on the model of the interior area and the location; and providing the audio filter to the second device, where the audio filter is to be used by the second device to present audio content to the user, and the audio content, as modified by the audio filter, is to appear as if it is made by the graphical representation.

Example 4 provides the method of example 3, where the model is a three-dimensional representation of the interior area, and obtaining the model of the interior area includes generating the three-dimensional representation of the interior area based on depth information describing the interior area.

Example 5 provides the method of example 1, where generating the graphical representation of the agent includes providing a plurality of candidate graphical representations of the agent to the first device or the second device, the plurality of candidate graphical representations including the graphical representation; and receiving a selection of the graphical representation from the plurality of candidate graphical representations, the selection being made by the user through a UI provided by the first device or the second device.

Example 6 provides the method of example 1, where generating the graphical representation of the agent includes obtaining a model of a seat of the vehicle, the model including information of a structure of the seat; and generating the graphical representation based on the model of the seat, where the second device is configured to project the graphical representation onto the seat.

Example 7 provides the method of example 6, where the seat is a driver seat of the vehicle, and the user takes a passenger seat of the vehicle.

Example 8 provides the method of example 1, where the second device is configured to move based on an instruction from the agent.

Example 9 provides the method of example 1, where the first device and the second device are a same device associated with the user.

Example 10 provides the method of example 1, further including identifying a part of the vehicle based on the interaction of the agent with the user; generating a graphical representation of the part of the vehicle; and providing the graphical representation of the part of the vehicle to the second device, where the graphical representation of the part of the vehicle is projected to the user by the second device.

Example 11 provides one or more non-transitory computer-readable media storing instructions executable to perform operations, the operations including receiving a request for assistance from a first device, the request for assistance made by a user receiving a service from a vehicle; assigning the request for assistance to an agent who is to assist the user; generating a graphical representation of the agent; and providing the graphical representation to a second device, where the graphical representation is projected to the user by the second device for facilitating an interaction of the agent with the user.

Example 12 provides the one or more non-transitory computer-readable media of example 11, where the graphical representation is an animated graphical representation and is configured to have a conversation with the user based on information provided by the agent.

Example 13 provides the one or more non-transitory computer-readable media of example 12, where the operations further include obtaining a model of an interior area of the vehicle; determining a location of the graphical representation in the interior area; generating an audio filter based on the model of the interior area and the location; and providing the audio filter to the second device, where the audio filter is to be used by the second device to present audio content to the user, and the audio content, as modified by the audio filter, is to appear as if it is made by the graphical representation.

Example 14 provides the one or more non-transitory computer-readable media of example 13, where the model is a three-dimensional representation of the interior area, and obtaining the model of the interior area includes generating the three-dimensional representation of the interior area based on depth information describing the interior area.

Example 15 provides the one or more non-transitory computer-readable media of example 11, where generating the graphical representation of the agent includes providing a plurality of candidate graphical representations of the agent to the first device or the second device, the plurality of candidate graphical representations including the graphical representation; and receiving a selection of the graphical representation from the plurality of candidate graphical representations, the selection being made by the user through a UI provided by the first device or the second device.

Example 16 provides the one or more non-transitory computer-readable media of example 11, where generating the graphical representation of the agent includes obtaining a model of a seat of the vehicle, the model including information of a structure of the seat; and generating the graphical representation based on the model of the seat, where the second device is configured to project the graphical representation onto the seat.

Example 17 provides the one or more non-transitory computer-readable media of example 16, where the operations further include identifying a part of the vehicle based on the interaction of the agent with the user; generating a graphical representation of the part of the vehicle; and providing the graphical representation of the part of the vehicle to the second device, where the graphical representation of the part of the vehicle is projected to the user by the second device.

Example 18. A computer system, including a computer processor for executing computer program instructions; and one or more non-transitory computer-readable media storing computer program instructions executable by the computer processor to perform operations including receiving a request for assistance from a first device, the request for assistance made by a user receiving a service from a vehicle, assigning the request for assistance to an agent who is to assist the user, generating a graphical representation of the agent, and providing the graphical representation to a second device, where the graphical representation is projected to the user by the second device for facilitating an interaction of the agent with the user.

Example 19 provides the computer system of example 18, where the graphical representation is an animated graphical representation and is configured to have a conversation with the user based on information provided by the agent.

Example 20 provides the computer system of example 19, where the operations further include obtaining a model of an interior area of the vehicle; determining a location of the graphical representation in the interior area; generating an audio filter based on the model of the interior area and the location; and providing the audio filter to the second device, where the audio filter is to be used by the second device to present audio content to the user, and the audio content, as modified by the audio filter, is to appear as if it is made by the graphical representation.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:
receiving a request for assistance from a first device, the request for assistance made by a user receiving a service from a vehicle;
assigning the request for assistance to an agent who is to assist the user;
generating a graphical representation of the agent; and
providing the graphical representation to a second device, wherein the graphical representation is projected to the user by the second device for facilitating an interaction of the agent with the user.

2. The method of claim 1, wherein the graphical representation is an animated graphical representation and is configured to have a conversation with the user based on information provided by the agent.

3. The method of claim 2, further comprising:
obtaining a model of an interior area of the vehicle;
determining a location of the graphical representation in the interior area;
generating an audio filter based on the model of the interior area and the location; and
providing the audio filter to the second device,
wherein the audio filter is to be used by the second device to present audio content to the user, and the audio content, as modified by the audio filter, is to appear as if it is made by the graphical representation.

4. The method of claim 3, wherein the model is a three-dimensional representation of the interior area, and obtaining the model of the interior area comprises:
generating the three-dimensional representation of the interior area based on depth information describing the interior area.

5. The method of claim 1, wherein generating the graphical representation of the agent comprises:
providing a plurality of candidate graphical representations of the agent to the first device or the second device, the plurality of candidate graphical representations including the graphical representation; and receiving a selection of the graphical representation from the plurality of candidate graphical representations, the selection being made by the user through a user interface provided by the first device or the second device.

6. The method of claim 1, wherein generating the graphical representation of the agent comprises:

obtaining a model of a seat of the vehicle, the model comprising information of a structure of the seat; and generating the graphical representation based on the model of the seat, wherein the second device is configured to project the graphical representation onto the seat.

7. The method of claim 6, wherein the seat is a driver seat of the vehicle, and the user takes a passenger seat of the vehicle.

8. The method of claim 1, wherein the second device is configured to move based on an instruction from the agent.

9. The method of claim 1, wherein the first device and the second device are a same device associated with the user.

10. The method of claim 1, further comprising:

identifying a part of the vehicle based on the interaction of the agent with the user;

generating a graphical representation of the part of the vehicle; and providing the graphical representation of the part of the vehicle to the second device, wherein the graphical representation of the part of the vehicle is projected to the user by the second device.

11. One or more non-transitory computer-readable media storing instructions executable to perform operations, the operations comprising:

receiving a request for assistance from a first device, the request for assistance made by a user receiving a service from a vehicle;

assigning the request for assistance to an agent who is to assist the user;

generating a graphical representation of the agent; and providing the graphical representation to a second device, wherein the graphical representation is projected to the user by the second device for facilitating an interaction of the agent with the user.

12. The one or more non-transitory computer-readable media of claim 11, wherein the graphical representation is an animated graphical representation and is configured to have a conversation with the user based on information provided by the agent.

13. The one or more non-transitory computer-readable media of claim 12, wherein the operations further comprise:

obtaining a model of an interior area of the vehicle;

determining a location of the graphical representation in the interior area;

generating an audio filter based on the model of the interior area and the location; and providing the audio filter to the second device, wherein the audio filter is to be used by the second device to present audio content to the user, and the audio content, as modified by the audio filter, is to appear as if it is made by the graphical representation.

14. The one or more non-transitory computer-readable media of claim 13, wherein the model is a three-dimensional representation of the interior area, and obtaining the model of the interior area comprises:

generating the three-dimensional representation of the interior area based on depth information describing the interior area.

15. The one or more non-transitory computer-readable media of claim 11, wherein generating the graphical representation of the agent comprises:

providing a plurality of candidate graphical representations of the agent to the first device or the second device, the plurality of candidate graphical representations including the graphical representation; and receiving a selection of the graphical representation from the plurality of candidate graphical representations, the selection being made by the user through a user interface provided by the first device or the second device.

16. The one or more non-transitory computer-readable media of claim 11, wherein generating the graphical representation of the agent comprises:

obtaining a model of a seat of the vehicle, the model comprising information of a structure of the seat; and generating the graphical representation based on the model of the seat, wherein the second device is configured to project the graphical representation onto the seat.

17. The one or more non-transitory computer-readable media of claim 16, wherein the operations further comprise:

identifying a part of the vehicle based on the interaction of the agent with the user;

generating a graphical representation of the part of the vehicle; and providing the graphical representation of the part of the vehicle to the second device, wherein the graphical representation of the part of the vehicle is projected to the user by the second device.

18. A computer system, comprising:

a computer processor for executing computer program instructions; and one or more non-transitory computer-readable media storing computer program instructions executable by the computer processor to perform operations comprising:

receiving a request for assistance from a first device, the request for assistance made by a user receiving a service from a vehicle, assigning the request for assistance to an agent who is to assist the user, generating a graphical representation of the agent, and providing the graphical representation to a second device, wherein the graphical representation is projected to the user by the second device for facilitating an interaction of the agent with the user.

19. The computer system of claim 18, wherein the graphical representation is an animated graphical representation and is configured to have a conversation with the user based on information provided by the agent.

20. The computer system of claim 19, wherein the operations further comprise:

obtaining a model of an interior area of the vehicle;

determining a location of the graphical representation in the interior area;

generating an audio filter based on the model of the interior area and the location; and providing the audio filter to the second device, wherein the audio filter is to be used by the second device to present audio content to the user, and the audio content, as modified by the audio filter, is to appear as if it is made by the graphical representation.

* * * * *